United States Patent [19]
Thayer

[11] Patent Number: 5,732,140
[45] Date of Patent: Mar. 24, 1998

[54] ACOUSTIC SPEAKER SYSTEM WITH EXPANDABLE SPEAKER ENCLOSURE

[76] Inventor: Keith Thayer, 24425 Corta Cresta, Lake Forest, Calif. 92630

[21] Appl. No.: 593,138

[22] Filed: Feb. 1, 1996

[51] Int. Cl.$^6$ .............................. H04R 1/02; H04R 5/02
[52] U.S. Cl. ..................... 381/24; 381/90; 381/188; 381/159; 181/172; 181/154
[58] Field of Search ........................... 381/88, 90, 188, 381/205, 159, 24; 181/154, 172, 199

[56] References Cited

U.S. PATENT DOCUMENTS 4,591,020  5/1986  Hruby, Jr. ........................... 181/145
4,601,361  7/1986  Nakada ................................ 181/141

*Primary Examiner*—Forester W. Isen
*Attorney, Agent, or Firm*—Gary Appel

[57] ABSTRACT

An audio speaker system has at least one expandable speaker enclosure which comprises a rigid upper wall, a speaker mounted to the upper wall and a rigid bottom wall. One edge of the bottom wall is pivotally attached to a corresponding edge of the upper wall. Flexible side walls interconnect the upper and bottom walls so as to form a substantially closed speaker enclosure, the side walls being configured for enabling the enclosure to be varied between a first, collapsed configuration for carrying and a second, expanded configuration having a predetermined optimum enclosed volume for sound quality when in use. A stereo pair of such enclosures have provisions for detachable attachment to the bottom of a keyboard portion of a notebook-type computer. Variations are described in which the stereo pair of expandable disclosures are integrated, in one case, into the keyboard portion, and in another case, into the display portion of a specialized notebook-type computer.

14 Claims, 4 Drawing Sheets

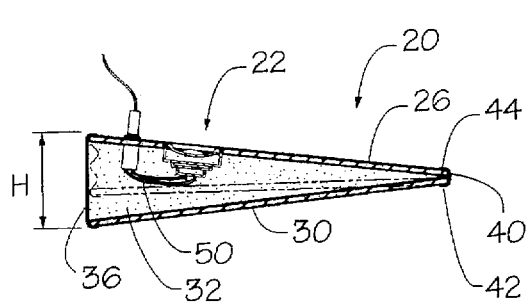
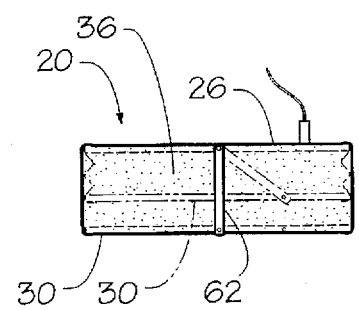
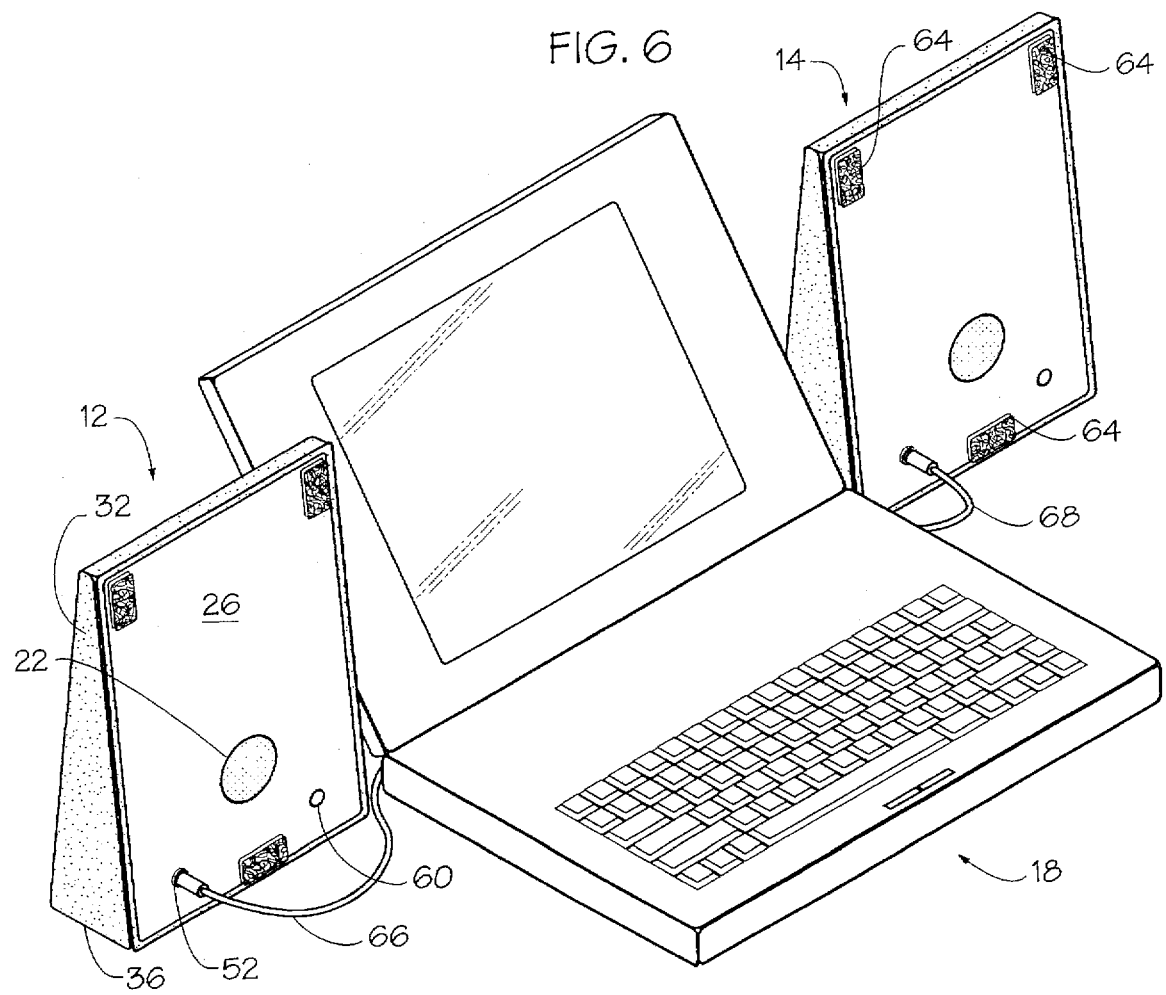

ACOUSTIC SPEAKER SYSTEM WITH EXPANDABLE SPEAKER ENCLOSURE

BACKGROUND OF THE INVENTION

1. Field of the Invention

The present invention relates generally to the field of acoustical devices and, more particularly, to audio speaker systems.

2. Background Discussion

It is generally common knowledge that computer technology is developing at an astounding rate. In the field of desktop computers of the type sold in computer and electronic stores catering to the public, only a few years ago top of the line computers had operating speeds of only 25–50 Hz, about 4 MB of RAM, hard disc capacities of about 100 MB and, if CD drives were included, the drives were only single speed. About a year ago, desktop computers having speeds of 100 MHz, hard drive storage capacities of about 1.6 gigabytes, 8 MB of RAM and double speed CD drives were considered top of the line. A year later, desktop computers operating at 125 MHZ, with 1.6 gigabytes of storage, 16 MB of RAM and quad speed CD drives are advertised at the same prices as last years top of the line desktop computers.

Such high speeds, large RAM and hard drive capacities, and fast CD drives are needed for running many of today's software programs—many of which require as much as 40 MB of hard drive space. Moreover many CD ROM discs require high speed drives to provide for fast retrieval of data and to enable good monitor picture quality.

Expanding software requirements fuel the need for faster computers with greater storage space. At the same time, availability of computers with fast speeds and high storage capacity spur the development of even more complex software.

By and large, development of small portable computers has kept pace with the development of desktop computers. A few years ago a heavy "laptop" computer was the state of the art for portable computers—now they have been totally replaced by smaller and much more powerful notebook computers.

As more and more information, for example, legal publications and State and Federal Law Reports, have become electronically available on CD ROMS, multimedia notebook computers, complete with color screens, CD drives, modems and sound cards are now available. Many of these current multimedia notebook computers are at least the equivalents of last year's top-of-the-line desktop computers, and have become portable offices for many professionals, such as attorneys, whose businesses rely upon the rapid analysis of large volume of information available in electronic media.

Associated with multi-media computers are acoustic speaker enclosures which provide sound capabilities to computers having sound card installed. Various types and qualities of speaker enclosures are available for desktop computers where portability is not an issue and where there is usually sufficient space for reasonably good speaker enclosures.

However, so far as is known to the present inventor, small, good quality, readily portable speaker enclosures are not available for multimedia notebook computers. Known small speaker enclosures which could be used with notebook computers having sound capabilities require too much space for convenient carrying, for example, in present notebook carrying cases or briefcases.

It is, therefore, a principle objective of the present invention to provide small speaker enclosures which are expandable from a small carrying size so as to provide good sound capabilities for multimedia notebook computers and also which are adaptable for being integrated in notebook computers no larger than today's notebook computers.

SUMMARY OF THE INVENTION

In accordance with the present invention, there is provided an audio speaker system having at least one expandable speaker enclosure which comprises a rigid upper wall, a speaker and means for mounting the speaker to the upper wall, a bottom wall, and flexible side walls interconnecting the upper and bottom walls so as to form a substantially closed speaker enclosure. The side walls are configured for enabling the enclosure to be varied between a first, collapsed configuration and a second, expanded configuration in which an enclosed volume is at a maximum.

Preferably, the bottom wall is formed of a rigid material and one edge thereof is pivotally attached to a corresponding side edge of said upper walls, the flexible side walls interconnecting the remaining corresponding edges of the upper and bottom walls. Releasable latching means are included for selectively maintaining the upper and bottom walls in relative collapsed positions corresponding to the first, collapsed configuration of the enclosure and in relative expanded positions corresponding to the second, expanded configuration of the enclosure.

Means are included for detachably attaching the upper wall of the enclosure to a bottom surface of a notebook computer so the speaker enclosure, and preferably a pair of such enclosures, can be detached from the computer and set up along side thereof, when the speakers are to be used in conjunction with the computer.

In a variation in which the speaker system is integrated into a notebook computer, the means for mounting the speaker to the upper wall include a tubular conduit speaker extension member having one end region connected to the upper wall and having the speaker mounted at the other end of the tubular conduit member. In such variation, the upper wall is formed having an aperture around which the tubular conduit member is connected to the upper wall so that the speaker is acoustically connected by the tubular conduit member to the inside of the enclosure. When integrated into a notebook computer, the tubular conduit speaker extension member extends upwardly through the keyboard portion of the computer so that the speaker is substantially flush with the upper surface of the keyboard.

Thus, in combination with a portable computer having sound capabilities, the acoustic sound system of the present invention has at least one acoustic speaker enclosure and preferably a stereo pair of the enclosures, each speaker enclosure comprising rigid upper and bottom walls, a speaker which is connected to the upper wall by a tubular conduit speaker extension member, means for pivotally connecting corresponding edges of the upper wall and the bottom wall together, and flexible side walls interconnecting remaining edges of the upper and bottom walls so as to form a substantially closed speaker enclosure, the side walls being configured for enabling the volume of the enclosure to be varied between a first, collapsed configuration and a second, expanded configuration of maximum volume.

In one variation, means are included for mounting the upper wall of the speaker enclosures to a bottom region of a keyboard portion of the computer. The tubular conduit speaker extensions extend from the upper wall upwardly through the keyboard region of the computer so that the speaker is at a level with an upper surface of the keyboard portion, the speaker also acoustically communicating through the tubular conduit member with the inside of the enclosure.

In a first variation in which the speaker system in integrated into a notebook computer, the means for mounting the speaker to the upper wall include a tubular conduit speaker extension member having one end region connected to the upper wall and having the speaker mounted at the other end of the tubular conduit member. The upper wall is formed having an aperture around which the tubular conduit member is connected to the upper wall so that the speaker is acoustically connected by the tubular conduit member to the inside of the enclosure.

Accordingly, in combination with a notebook-type computer having sound capabilities, the acoustic sound system of the present invention preferably includes a stereo pair of the enclosures, each speaker enclosure comprising rigid upper and bottom walls, a speaker which is connected to the upper wall by a tubular conduit speaker extension member, means for pivotally connecting corresponding edges of the upper wall and the bottom wall together and flexible side walls interconnecting remaining edges of the upper and bottom walls so as to form a substantially closed speaker enclosure. The side walls are configured for enabling the volume of the enclosure to be varied between a first, collapsed configuration and a second, expanded configuration of maximum volume.

In the first variation, the upper wall of each of the expandable speaker enclosures is attached to the bottom surface of the keyboard portion of the notebook-type computer with the tubular conduit conduit speaker extension member extending upwardly thought the keyboard portion of the computer so that the speaker is substantially flush with the upper surface of the keyboard portion, the speaker also acoustically communicating through the tubular conduit member with the inside of the speaker enclosure.

Alternatively, in a second variation, the upper wall of each of the expandable speaker enclosures is attached to the back surface of the display portion of the notebook-type computer with the speaker member extending forwardly through the display portion of the computer so that the speaker is substantially flush with the front surface (when the computer is open for use) of the display portion, the speaker acoustically communicating with the inside of the speaker enclosure.

BRIEF DESCRIPTION OF THE DRAWINGS

The present invention can be more readily understood by a consideration of the following detailed description when taken in conjunction with the accompanying drawings, in which:

FIG. 4 is a longitudinal cross sectional drawing taken along line 4—4 of FIG. 2 showing forward edges of upper and bottom walls of the enclosure pivotally connected together;

FIG. 5 is a rear view of the speaker enclosure of FIG. 2, showing a releasable locking element that is used to maintain the enclosure in its expanded and collapsed positions relative to the front wall;

FIG. 6 is a perspective drawing showing a left-hand and right-hand pair of expandable speaker enclosures in their expanded condition and showing the speaker enclosures connected respectively to the left-hand and right-hand sides of a conventional notebook-type computer for providing stereo sound;

In the several FIGS. identical elements and features are given the same reference number.

DETAILED DESCRIPTION OF THE INVENTION

Figure 1:
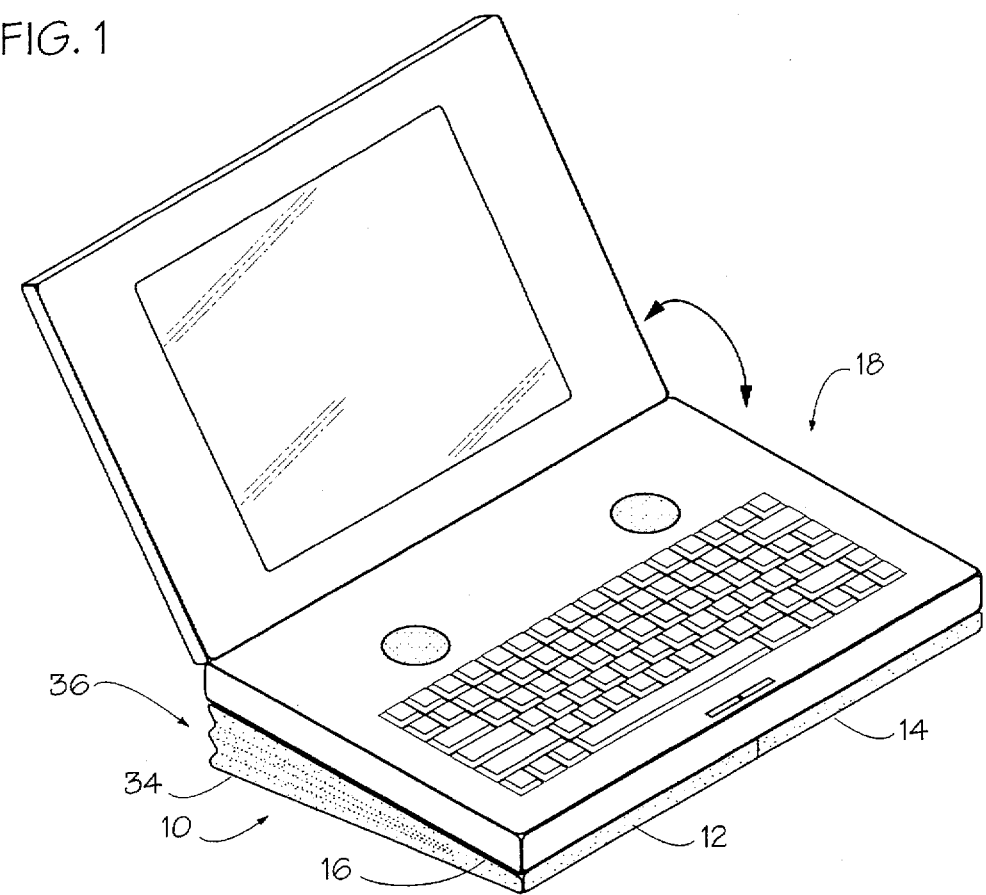
FIG. 1 is a perspective drawing showing audio speaker system having a pair of side-by-side, expandable speaker enclosures of the present invention attached to a bottom surface of a conventional notebook-type computer, the speaker enclosures being shown in their collapsed condition for carrying.

There is shown in FIG. 1, in accordance with a preferred embodiment of the present invention, an acoustic speaker system 10 which includes respective left-hand and right-hand expandable speaker enclosures 12 and 14 that detachably attached to a bottom surface 16 of a conventional notebook computer 18. Each of expandable speaker enclosures 12 and 14, which are preferably identical to one another and are merely assigned different reference numbers for clarity of description, are shown in their collapsed configuration.

Figure 2:
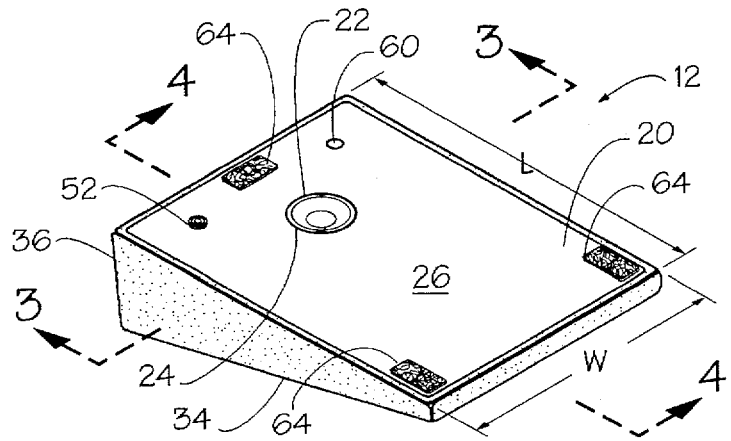
FIG. 2 is a perspective drawing of a representative one of the expandable speaker enclosure of FIG. 1 showing the speaker enclosure in its expanded configuration for obtaining optimum speaker performance during use and further showing the location of a small speaker mounted into the upper wall of the enclosure and a small aperture in the upper wall for maximizing the sound of bass notes.
Figure 3:
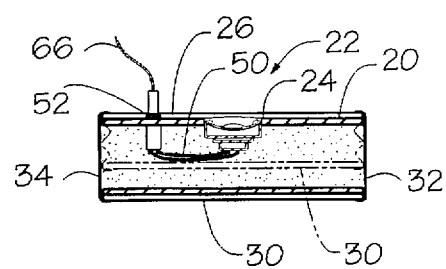
FIG. 3 is a transverse cross sectional drawing taken along line 3—3 of FIG. 2 showing the mounting of the speaker enclosure and showing the bottom wall in its expanded position and further showing the position, in phantom lines, of the bottom wall in its collapsed position.

Left-hand speaker enclosure 12 (which is also representative of right-hand speaker enclosure 14) is shown in FIGS. 2–5 in its expanded use condition in which the enclosed volume is preestablished for providing optimum sound. Shown comprising enclosure 12 is a rigid upper wall 20 in which a small speaker 22 is mounted, for example, by a suitable bonding adhesive. Speaker 22 is mounted in upper wall 20 so that an upper peripheral region 24 of the speaker is flush with an upper surface 26 of the upper wall (FIG. 3).

Further comprising enclosure 12 are a rigid lower or bottom wall 30 and flexible fabric side walls 32, 34 and 36 (FIGS. 3 and 4) which permit collapsing and expanding of the enclosure. As seen in FIG. 4, forward edges 40 and 42 of upper wall 20 and bottom wall 30, respectively, of enclosure 12 are hinged together by a strip 44 of flexible fabric so as to permit relative pivotal movement of the upper and bottom walls as required for permitting the expanding and collapsing of the enclosure. Upper and lower edges of side walls 32, 34 and 36 are attached, by a suitable adhesive, to corresponding edge regions of upper and bottom walls 20 and 30. FIG. 1 shows speaker enclosure 12 in its collapsed configuration as is generally appropriate for carrying the enclosure and its associated computer 18. FIG. 2–6, in contrast, show enclosure 12 in its fully expanded configuration as would be appropriate for use, with FIGS. 3 and 5, showing in phantom lines the position of bottom wall 30 relative to upper wall 20 when speaker enclosure 12 is in its collapsed condition.

Speaker 22 is connected by a dual electrical conduit 50 internally of enclosure 12 to an under end of a conventional bayonet connector receptacle 52 which is mounted to and through enclosure upper wall 20 outboard of the speaker (FIG. 3).

For improved audio sound to be provided by speaker enclosure 12 when it is in its expanded configuration shown in FIGS. 2–6, a small aperture 60 is made or formed in upper wall 20. The diameter of aperture 60 is selected in conjunction to the volume of speaker enclosure 12 in its expanded configuration to enhance the base sound.

There is shown in FIG. 5 a hinged locking mechanism 62 which releasably locks upper and bottom walls 20 and 30 relative to one another in both the extended positions and the collapsed positions of the two walls.

Speaker enclosure 12 includes means 64, such as one half of a hook and loop mating pair of materials (FIGS. 2 and 6) to enable the enclosure to be detachably attached to bottom surface 16 of computer 18 (FIG. 1). In the case of using one half of a mating pair of hook and loop materials, the other half of the pair would be attached in appropriate locations to computer bottom surface 16 (not shown).

EXAMPLE

By way of example, with no limitations thereby intended or implied, speaker enclosure 12 may have a length, L, of about 8 inches, a width, W, of about 6 inches and an expanded height (at the rear) of about 2 inches (FIGS. 2 and 4). These dimensions provide a speaker enclosure volume of about 24 cubic inches.

Speaker 22 may be about 1¼ inches in diameter, and aperture 60 may be about ¼ to 5/16 of an inch in diameter. Upper and lower walls may be made of a rigid sheet of material, such as PLEXIGLASS, that is about ¼ of an inch thick.

OPERATION

The operation of acoustic system 10 is generally obvious from the above-description of the system. As shown in FIG. 1, acoustic enclosures 12 and 14, when not in use and in their collapsed configuration, are detachably attached to the bottom of computer 18. When speaker enclosures 12 and 14 are to be used, they are detached from computer 18 and are expanded to their full open condition (FIG. 2). Thereafter, enclosures 12 and 14 are deployed to opposite sides of computer 18 and are connected by speaker wires 66 and 68 to the computer (FIG. 6).

Figure 7:
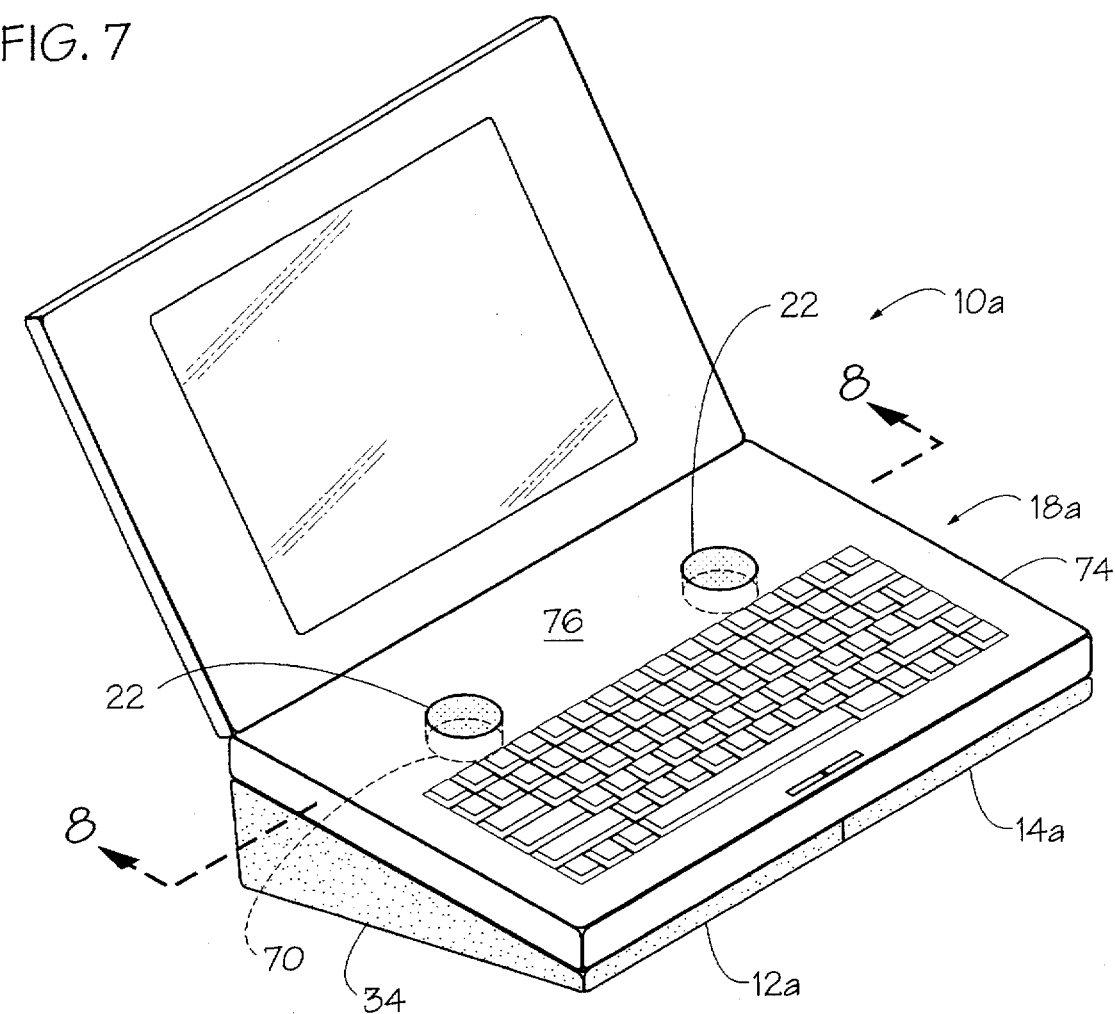
FIG. 7 is a perspective drawing showing a variation speaker system shown integrated into the keyboard portion of a notebook-type computer, a pair of spatially separated speakers being arranged for stereo sound.
Figure 8:
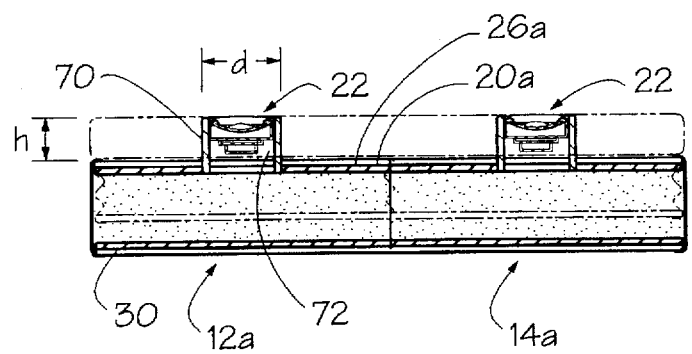
FIG. 8 is a cross sectional drawing taken along line 8—8 of FIG. 7, showing mounting of the speakers in tubular conduit extension of the expanded speaker enclosures.

Variation of FIGS. 7 and 8.

Shown in FIGS. 7 and 8 is a first variation acoustic speaker system 10a which corresponds generally to above-described acoustic speaker system 10 and which is shown integrated into a notebook-type computer 18a which corresponds to above-described computer 18.

Comprising speaker system 10a are left-hand and right-hand expandable speaker enclosures 12a and 14a which, except as specifically described below, are the same as expandable enclosures 12 and 14 described above.

As shown in FIG. 8 for representative enclosure 12a, speaker 22, instead of being mounted flush with upper surface 26a of the enclosure, as was the case for speaker 22 which was described above as being mounted flush to surface 26 of enclosure 12, is mounted at the upper end of a tubular speaker extension member 70. A lower end of member 70 is joined to upper wall 20a at an aperture 72 formed therethrough.

Figure 9:
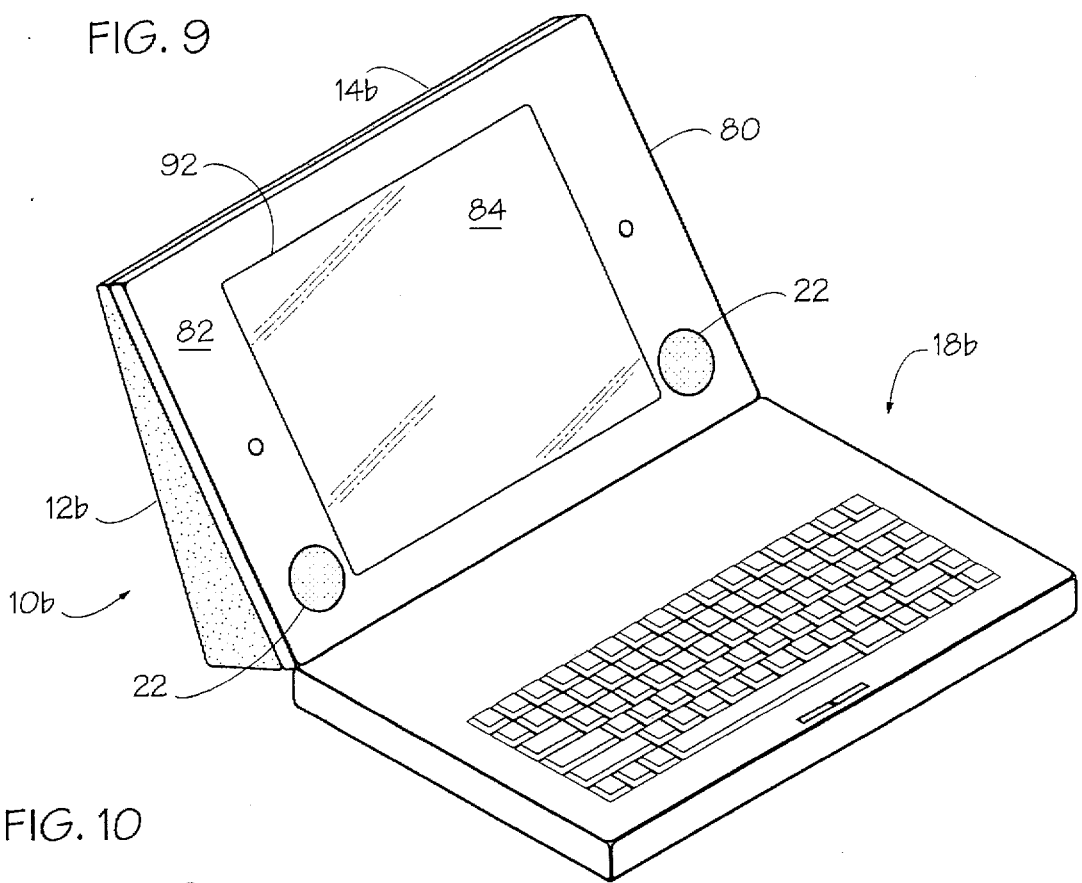
FIG. 9 is perspective drawing showing a second variation speaker system shown integrated into the display portion of a notebook-type computer, a pair of spatially separated speakers being arranged for stereo sound.
Figure 10:
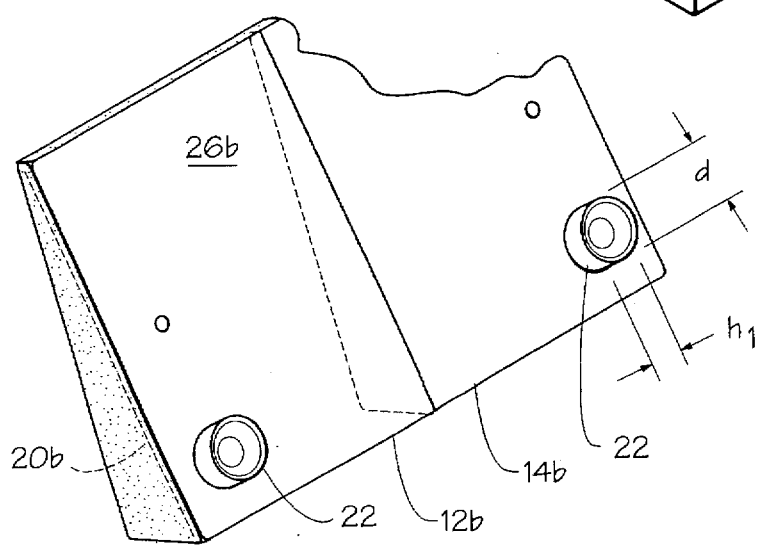
FIG. 10 is a partial perspective drawing showing a representative one of the two expandable speaker enclosures integrated into the display portion of a notebook-type computer.

The height, h, of member 70 is such that with upper wall 20a of enclosure 12a attached (or formed as part of) the bottom of computer 18a, the member extends upwardly through a keyboard portion 74 of the computer so that speaker 22 is substantially flush with an upper surface 76 of the keyboard portion. Inside diameter, d, of tubular conduit member is about the same as the diameter of speaker 22 (FIG. 8). Variation of FIGS. 9 and 10:

Shown in FIGS. 9 and 10 is a second variation acoustic speaker system 10b which corresponds generally to above-described acoustic speaker system 10 and which is shown integrated into a notebook-type computer 18b which corresponds to above-described computer 18.

Comprising speaker system 10b are left-hand and right-hand expandable speaker enclosures 12b and 14b which, except as specifically described below, are the same as expandable enclosures 12 and 14 described above.

As shown in FIG. 10 for representative enclosure 12b, speaker 22, is mounted flush with upper surface 26b of the enclosure, as was the case for speaker 22 which was described above as being mounted flush to surface 26 of enclosure 12.

Speaker 22 is mounted substantially flush with a front surface 82 of the display portion outboard of the actual display 84.

It is to be appreciated that although reference has been made above to notebook-type computers (e.g., computer 18, 18a and 18b) for purposes of describing the invention, it is to be understood that the invention may also be applied to other types of small portable computers which may not be designated as notebook types. For example, the present invention could be applied to so-called "palmtop" computers when and if such computers are provided with sound capabilities.

Thus, although there has been described and illustrated an audio speaker system having at least one variable volume speaker enclosure and two variations thereof, in accordance with the present invention for purposes of illustrating the manner in which the invention may be used to advantage, it is to be appreciated that the invention is not limited thereto. Therefore, any and all variations and modifications that may occur to those skilled in the applicable art are to be considered as being within the scope and spirit of the claims as appended hereto.

What is claimed is:

1. An audio speaker system having at least one expandable speaker enclosure comprising:

a. a rigid upper wall;

b. a speaker and means for mounting said speaker to said upper wall;

c. a rigid bottom wall;

d. means for pivotally connecting corresponding edges of the upper wall and the bottom wall together; and e. flexible side walls interconnecting remaining edges of said upper and bottom walls so as to form a substantially closed speaker enclosure, said side walls being configured for enabling the volume of said enclosure to be varied between a first, collapsed configuration and a second, expanded configuration of maximum volume.

2. The speaker system as claimed in claim 1, wherein said enclosure includes releasable latching means for selectively maintaining said upper and bottom walls in relative closed positions corresponding to said first collapsed configuration of said enclosure and in relative open positions corresponding to said expanded configuration of said enclosure.

3. The speaker system as claimed in claim 1, wherein said means for mounting said speaker to said upper wall includes a conduit speaker extension member having one end region connected to said upper wall and having said speaker mounted at the other end of said tubular conduit member, said front wall being formed having an aperture around which said conduit member is connected so that the speaker is acoustically connected by said tubular conduit member to the inside of said enclosure.

4. In combination with a portable computer having sound capabilities, an acoustic sound system having at least one acoustic speaker enclosure comprising:

a. a rigid upper wall;

b. a speaker and means for mounting said speaker to said upper wall;

c. a rigid bottom wall;

d. means for pivotally connecting corresponding edges of the upper wall and the bottom wall together; and e. flexible side walls interconnecting remaining edges of said upper and bottom walls so as to form a substantially closed speaker enclosure, said side walls being configured for enabling the volume of said enclosure to be varied between a first, collapsed configuration and a second, expanded configuration of maximum volume, and means for mounting said upper wall to a bottom region of a keyboard portion of said computer.

5. The combination as claimed in claim 4, wherein said means for mounting said speaker to said upper wall includes a tubular speaker extension member having one end region connected to said upper wall and having said speaker mounted at the other end of said tubular conduit member, said front wall being formed having an aperture around which said tubular conduit member is connected so that the speaker is acoustically connected by said tubular conduit member to the inside of said enclosure.

6. The combination as claimed in claim 5, wherein said tubular conduit member extends from said upper wall upwardly through said keyboard region of said computer so that said speaker is at a level with an upper surface of said keyboard portion.

7. The combination as claimed in claim 4, wherein said enclosure includes releasable latching means for selectively maintaining said upper and bottom walls in relative closed positions corresponding to said first collapsed configuration of said enclosure and in relative open positions corresponding to said expanded configuration of said enclosure.

8. In combination with a portable computer having sound capabilities, a stereo sound system having first and second acoustic speaker enclosures, each of said enclosures comprising:

a. a rigid upper wall;

b. a speaker and means for mounting said speaker to said upper wall;

c. a rigid bottom wall;

d. means for pivotally connecting corresponding edges of the upper wall and the bottom wall together; and e. flexible side walls interconnecting remaining edges of said upper and bottom walls so as to form a substantially closed speaker enclosure, said side walls being configured for enabling the volume of said enclosure to be varied between a first, collapsed configuration and a second, expanded configuration of maximum volume, and means for mounting said upper wall to a bottom region of a keyboard portion of said computer.

9. The combination as claimed in claim 8, wherein said means for mounting said speaker to said upper wall includes a tubular conduit speaker extension member having one end region connected to said upper wall and having said speaker mounted at the other end of said tubular conduit member, said front wall being formed having an aperture around which said tubular conduit member is connected so that the speaker is acoustically connected by said tubular conduit member to the inside of said enclosure, said tubular conduit member extending from said upper wall upwardly through the keyboard region of the computer so that the speaker is at a level with an upper surface of the keyboard portion.

10. The combination as claimed in claim 8, wherein said enclosure includes releasable latching means for selectively maintaining said upper and bottom walls in relative closed positions corresponding to said first collapsed configuration of said enclosure and in relative open positions corresponding to said expanded configuration of said enclosure.

11. In combination with a portable computer having sound capabilities, a stereo acoustic sound system having first and second acoustic speaker enclosures, each of said enclosures comprising:

a. a rigid upper wall;

b. a speaker and means for mounting said speaker to said upper wall;

c. a rigid bottom wall;

d. means for pivotally connecting corresponding edges of the upper wall and the bottom wall together; and e. flexible side walls interconnecting remaining edges of said upper and bottom walls so as to form a substantially closed speaker enclosure, said side walls being configured for enabling the volume of said enclosure to be varied between a first, collapsed configuration and a second, expanded configuration of maximum volume, and means for mounting said upper wall to a back surface of a display portion of said computer.

12. The combination as claimed in claim 11, wherein said speaker is mounted to said upper wall, said front wall being formed having an aperture so that the speaker is acoustically connected to the inside of said enclosure, said speaker extending from said upper wall through the display portion of the computer so that the speaker is at a level with a user-facing surface of the display portion when the display portion is opened from a keyboard portion of the computer.

13. The combination as claimed in claim 11, wherein said enclosure includes releasable latching means for selectively maintaining said upper and bottom walls in relative closed positions corresponding to said first collapsed configuration of said enclosure and in relative open positions corresponding to said expanded configuration of said enclosure.

14. The speaker system as claimed in claim 1, including releasable latching means for selectively maintaining said upper and bottom walls in relative collapsed positions corresponding to said first collapsed configuration of the enclosure and in relative expanded positions corresponding to said second expanded configuration of the enclosure.

* * * * *